Figure 1:
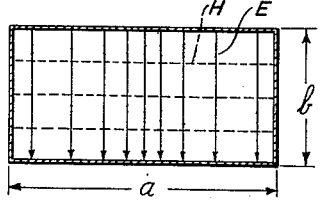

INVENTOR
A.E.BOWEN
BY
ATTORNEY

Sept. 13, 1938.　　　　　　A. E. BOWEN　　　　　　2,129,669
GUIDED WAVE TRANSMISSION
Filed May 19, 1937　　　　4 Sheets-Sheet 2
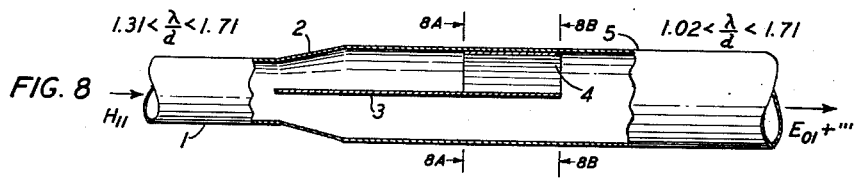
FIG. 8
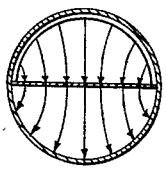
FIG. 8A
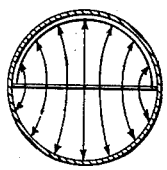
FIG. 8B
FIG. 8C
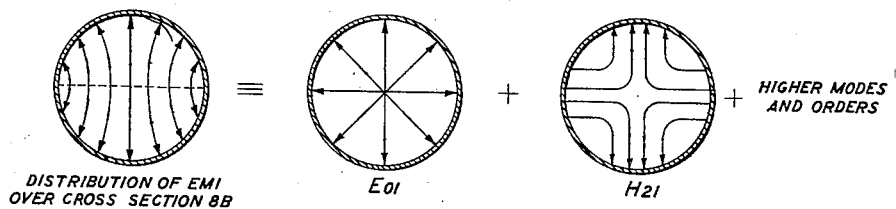
FIG. 9
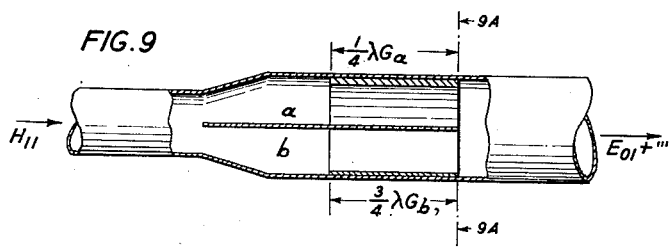
FIG. 9A
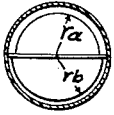
FIG. 10
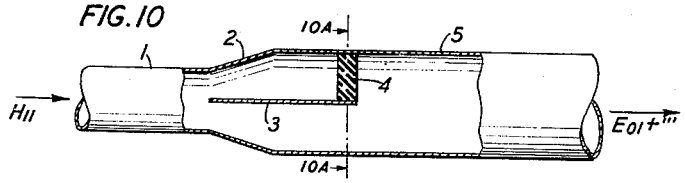
FIG. 10A
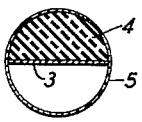
INVENTOR
A. E. BOWEN
BY
*J. A. Burgess*
ATTORNEY Sept. 13, 1938.  A. E. BOWEN  2,129,669
GUIDED WAVE TRANSMISSION
Filed May 19, 1937  4 Sheets-Sheet 3
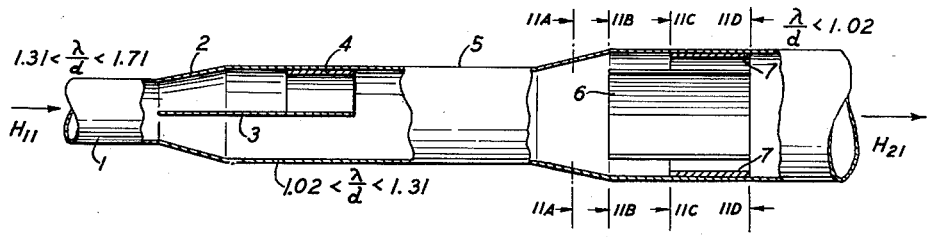
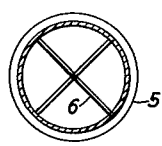 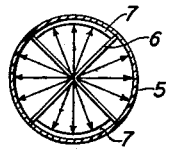 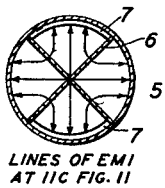 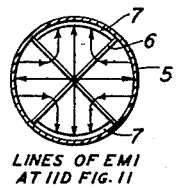
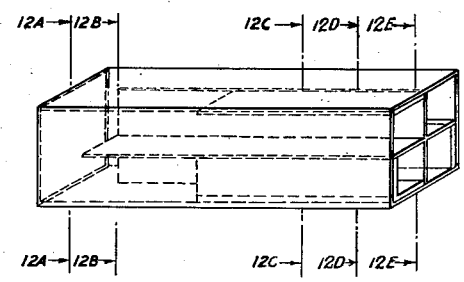
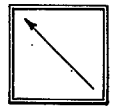 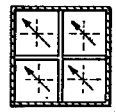 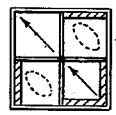 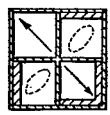 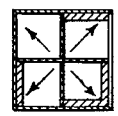
INVENTOR
A.E. BOWEN
BY
ATTORNEY Sept. 13, 1938.  A. E. BOWEN  2,129,669
GUIDED WAVE TRANSMISSION
Filed May 19, 1937  4 Sheets-Sheet 4
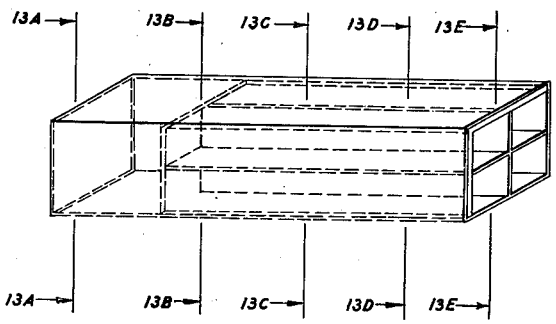
FIG.13
FIG.13A  FIG.13B  FIG.13C  FIG.13D  FIG.13E
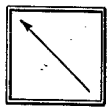 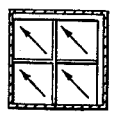 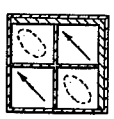 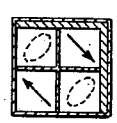 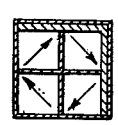
FIG.14A  FIG.14B  FIG.14C  FIG.14D  FIG.14E
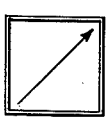 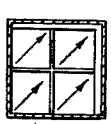 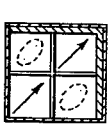 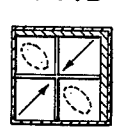 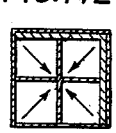
FIG.15 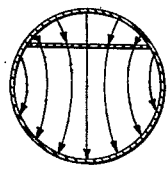   FIG.16 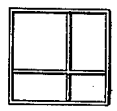
FIG.17 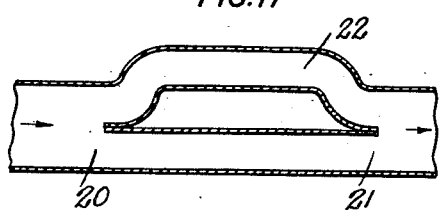   FIG.18 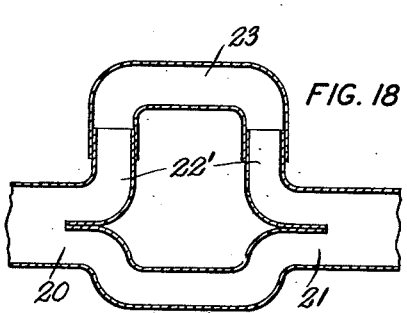
INVENTOR
A. E. BOWEN
BY
*J. T. A. Burgess*
ATTORNEY Patented Sept. 13, 1938

2,129,669

UNITED STATES PATENT OFFICE 2,129,669

GUIDED WAVE TRANSMISSION

Arnold E. Bowen, Red Bank, N. J., assignor to Bell Telephone Laboratories, Incorporated, New York, N. Y., a corporation of New York Application May 19, 1937, Serial No. 143,399

26 Claims. (Cl. 178—44)

The present invention relates to wave transmission systems, more particularly to systems utilizing dielectrically guided waves, and it is concerned principally, but in its broader aspects not exclusively, with the conversion of dielectrically guided waves from one type to another.

Dielectric guide systems of various kinds have been described in some detail heretofore in such pending applications for Letters Patent as those of G. C. Southworth, Serial No. 661,154, filed March 16, 1933, and Serial No. 701,711, filed December 9, 1933; S. A. Schelkunoff, Serial No. 56,959, filed December 31, 1935, and others, and in the papers by J. R. Carson et al. and Schelkunoff appearing in the April, 1936, issue of the Bell System Technical Journal. The dielectric guide itself has taken a wide variety of forms, but typical of guides disclosed heretofore is one consisting of a rod of dielectric material and another consisting essentially of a metallic pipe containing a solid or gaseous dielectric medium.

A form of dielectric guide that lends itself well to the purposes in hand is one consisting of a metallic pipe, evacuated or filled with air, and it is in terms of such a guide that my invention will be described. It is to be understood, however, that this is for illustrative purposes only and that the invention is not to be limited to this specific form of guide.

Dielectrically guided wave transmission as disclosed in the applications and publication cited above, is unique in several respects. In the first place it is evident that the provision of separate conducting paths for the go-and-return flow of conduction current is not an essential characteristic whereas in conventional guided wave systems known heretofore it is. Secondly, in each instance it has been observed that the guide presents the attenuation characteristic of a high-pass filter, that is, there is a certain critical or cut-off frequency separating the propagation range from a lower frequency range of zero or highly attenuated transmission. Moreover, it has been found that the critical frequency and the phase velocity of dielectrically guided waves are both functions of the transverse dimensions of the guide.

Dielectrically guided waves, as will more fully appear on further reading of this specification, are capable of transmission in an indefinitely large number of forms or types, each type being distinguished by the characteristic spacial distribution and inter-relation of the component electric and magnetic fields comprising the waves, and each type differs specifically from other types in certain transmission characteristics that are important with respect to the objects of this invention.

Under certain conditions it may be desirable for one reason or another to generate and propagate dielectrically guided waves of one type and at one point or another in the guide to convert these waves into waves of another type. The present invention relates primarily to methods and means for effecting such conversion of wave type.

One object is to provide means by which any given type of wave may be converted into another type and this type again converted back to the original type or to still other types in such manner and at such points as the particular situation may make desirable.

A further object is to permit the generation of a type of wave which is especially favorable from a generation point of view, and its conversion into a type which is especially favorable from a propagation point of view.

These and other objects of the present invention are similar to the objects of the invention presented in my copending application, Serial No. 133,810 filed March 31, 1937, in which is disclosed and claimed what I term "shunt conducting converters". In such converters, the action is accomplished by some form of thin conducting septum across a portion of the wave guide and it is essentially completed in a plane perpendicular to the axis of the guide.

In accordance with the present invention the converter function is accomplished by what might be called a "series converter" in that the conversion takes place as the wave travels through a converter section that is of a length comparable with a wave-length.

Although as hereinbefore noted, there are an indefinite number of types of dielectrically guided waves, it has been found that they fall into either of two broad classes. In the one class, assuming now for the sake of simplicity that the guide is in the form of a metallic pipe, the electric component of the wave is transverse to the pipe and at no point does it have a longitudinal component excepting as the pipe is not quite a perfect conductor. The magnetic component, on the other hand, has both transverse and longitudinal components. This class will be designated as "transverse electric" waves or TE waves. In the other class, the magnetic component is transverse to the pipe and at no point does it have a longitudinal component, but the electric component has in general both transverse and longitudinal components. This class will be designated as "transverse magnetic" waves or TM waves.

The various possible types of dielectrically guided waves in each of these two classes may be identified and distinguished from each other by their order and by their mode. The order of the wave is determined by the manner in which the field intensity varies circumferentially around the axis of the guide, whereas the mode is determined by the manner of its variation with distance from the axis of the guide. Reference is made here to the Schelkunoff application, supra, for a more complete discussion of this matter of mode and order. The usual convention is herein adopted of designating a TE wave by $H_{nm}$, where $n$ represents the order and $m$ the mode. Similarly a TM wave of the $n$th order and $m$th mode will be represented by $E_{nm}$.

The invention will be better understood by reference to the following detailed specification and the accompanying drawings, in which:

Figs. 1 to 7B show cross-sections of typical guides with the electric lines of force under differing conditions;

Figs. 8 to 8C refer to a converter of circular cross-section;

Figs. 9 to 11D relate to various modifications of Fig. 8;

Figs. 12 to 12E relate to a converter of rectangular cross-section; and

Figs. 13 to 14E relate to modifications of the converter of Fig. 12;

Figs. 15 and 16 show modifications of the structure of Figs. 8 and 12 while Figs. 17 and 18 show further modifications of Fig. 8.

Reference may be made to my copending application for a brief description of some of the simpler forms of waves as they may exist in a hollow cylindrical conductor and the cut-off frequency characteristic of the different forms of waves. Such waves can be transmitted not only in guides of circular cross-section as shown but also in circular guides divided into sectors by longitudinal partitions suitably disposed with respect to the lines of electromotive intensity. Also in much the same way that electromagnetic waves of different types can exist inside of hollow conducting guides of cylindrical cross-section they can exist in guides of other cross-sections. In guides of square or rectangular cross-sections the waves are of a notably simpler appearance and their properties are characterized by quite simple formulae. For the present specification it is sufficient to discuss the disposition of the lines of electromotive intensity in these waves and their propagation constants.

In Fig. 1 there is shown a cross-section of a rectangular guide with sides of lengths $a$ and $b$. The most elementary of the wave types which can be propagated through this guide is one with the lines of electromotive intensity disposed, as shown in the figure, parallel to one of the sides of the rectangle. The lines of magnetomotive intensity shown dotted, are everywhere perpendicular to the lines of electromotive intensity. It can be shown both theoretically and experimentally that a wave of this type can be propagated when $\lambda_a$, the wave-length in free space, is less than $2a$, where $a$ is the length of the side of the rectangle to which the lines of electromotive intensity are perpendicular. Along any of the lines shown the electromotive intensity is constant but the magnitude of the electromotive intensity varies from a maximum at the middle of the guide to zero at the side faces, following a sine law. The lines of magnetomotive intensity are closed longitudinally within the guide but the lines of electromotive intensity have no longitudinal components, they being completed through the metallic periphery of the guide. The wave is thus similar in many respects to the $H_{11}$ wave in a circular guide and if a rectangular guide carrying such a wave were connected to a circular guide through a simple tapering adapter, the wave would pass with but little disturbance from the rectangular to the circular guide and give rise to a pure $H_{11}$ wave in the latter.

The wave-length of the wave in the rectangular guide is given by $$\lambda_G = \frac{\lambda_a}{\sqrt{1-\left(\frac{\lambda_a}{2a}\right)^2}}.$$

It is important to note that for a given value of $\lambda_a$, that is, for a given frequency, this wave-length within the guide depends only on the dimension $a$; the dimension $b$ can be varied as we choose without any effect on $\lambda_G$ although the attenuation is affected by variation of $b$. The vector representing the electromotive intensity in the wave front is linearly polarized, that is, at any point its amplitude varies sinusoidally with time, but the direction of the vector remains unchanged.

Figure 2:
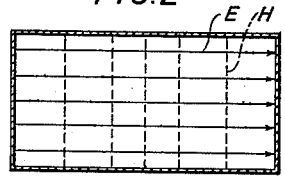

Another wave which can exist in the rectangular guide shown in Fig. 1, is one with lines of electromotive intensity rotated 90 degrees from the direction shown in Fig. 1, as appears in Fig. 2. In general appearance this wave is similar to that of Fig. 1 but there is the important difference that for this wave the wave-length is given by $$\lambda_G = \frac{\lambda_a}{\sqrt{1-\left(\frac{\lambda_a}{2b}\right)^2}}.$$

That is, the wave-length within the guide is controlled entirely by the dimension $b$.

Figure 3A:
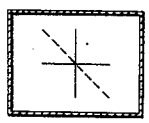
Figure 3B:
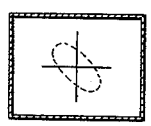
Figure 3C:
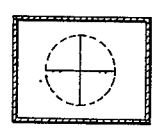
Figure 3D:
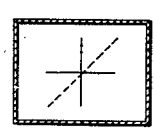

Referring now to Fig. 3A, suppose at one end of a rectangular guide one applies two plane waves of the sort pictured in Figs. 1 and 2, the waves being in time-phase at the end of the guide. It is well known that the resultant of two linearly polarized electromotive intensities in time-phase is also a linearly polarized electromotive intensity. The component electromotive intensities at the axis of the guide and their resultant are shown in Fig. 3A. As the waves progress, the phase of the one advances with respect to that of the other since their wave-lengths, and therefore their phase velocities, are different as pointed out above. Thus, the electromotive intensities are no longer in phase and the resultant electromotive intensity which was initially linearly polarized is now elliptically polarized, that is, the terminus of the vector describing it follows an ellipse as it goes through its cycle instead of a straight line. This is shown in Fig. 3B. When the waves have traveled to the point where the phase difference is one-quarter period the component electromotive intensities are in quadrature and if they are of equal amplitude the resultant electromotive intensity is circularly polarized as indicated in Fig. 3C. Proceeding still further to the point where the phase difference is 180 degrees the resultant electromotive intensity is again linearly polarized but in a direction rotated 90 degrees in space from the direction at the beginning of the guide. The cycle of progressive rotation of the resultant wave continues as long as the wave is confined to the rectangular guide and this important property of such waves in a rectangular guide will be found useful in the converters to be described presently.

Figure 4:
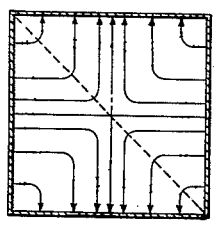
Figure 5A:
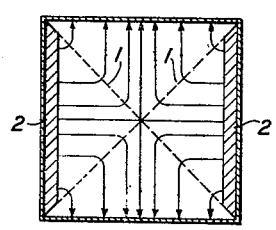
Figure 5B:
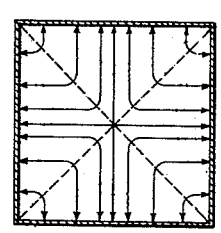

The disposition of the lines of electromotive intensity in another wave which can be supported in rectangular guides is shown in Fig. 4. For convenience the wave is shown in a square guide. The disposition of the lines of electromotive intensity for the wave shown is seen to be like that in an $H_{21}$ wave in a circular guide. Lines drawn from corner to corner of the rectangle are equipotential lines, and if thin plane sheets of perfectly conducting material were placed diagonally in the guide the wave passing through the guide would be entirely unaffected. At any cross-section the disposition of the lines of electromotive intensity would be as in Fig. 4 although there would be waves traveling independently in the four sectors. Suppose such sheets were inserted and then the dimensions of two opposite sectors were decreased as by inserting sheets of metal as shown at 2 in Fig. 5A, these being of any desired thickness even up to a large fractional part of the dimension which they are intended to alter. At the point where the dimension is decreased the configuration of the lines of electromotive intensity is as in Fig. 5A. Immediately upon entering the restricted section, however, the velocity of the waves in the constricted sectors becomes greater than before and as the waves move along their respective sectors the phase of the waves in the unmodified sectors advances with respect to that of the waves in the other two sectors. When the waves have advanced to the point where the difference in phase attains 180 degrees a cross-sectional view of the lines of electromotive intensity in the waves would be as in Fig. 5B. It will be noted that while the cross-sectional distribution initially appeared like that of an $H_{21}$ wave in a circular guide, in the cross-section of Fig. 5B the wave appears like the resultant of an $E_{01}$ and $H_{41}$ wave superposed. The idea of introducing a phase shift between the component portions of a wave as a means of converting wave types constitutes an important feature of my invention and will be used in the converters to be described presently. The desired phase shift can, of course, be introduced in other ways than by changing dimensions of sectors, as for instance by inserting dielectric sections in the proper sectors and adjusting the length of the inserted sections so that the phase-shift of 180 degrees or any other desired angle is introduced.

Figure 6:
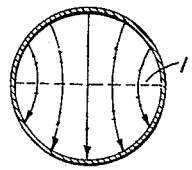
Figure 7A:
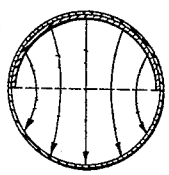
Figure 7B:
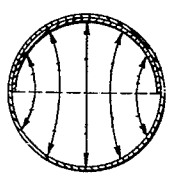

As another example of my invention, reference may be had to Fig. 6 where the disposition of the lines of electromotive intensity in an $H_{11}$ wave in a circular guide is shown. It is to be pointed out that if the guide is divided by a thin sheet of conducting material laid in a diametral plane perpendicular to the lines of electromotive intensity as shown at 1 of Fig. 6, the wave is entirely unaffected and the partition may be discontinued at any point with the wave proceeding as though the partition had not been there. Suppose, however, that at or following the point where the partition begins the radius of one of the semicircular halves is decreased as shown in Fig. 7A. Such decrease is shown in Fig. 7A as being physically quite small but it may be relatively large depending on what change in phase velocity in the two portions of the guide may be desired. In any case the phase of the wave in the unconstricted half advances with respect to the phase of the other wave and at some cross-section, as shown in Fig. 7B, the two waves will be in phase opposition so that the lines of electromotive intensity in their wave fronts will be as in Fig. 7B. It is readily seen that if the partition is discontinued at this point we have here a source of $E_{01}$ and $H_{21}$ waves, all as pointed out in the analysis of waves in my copending application. Either of these two components may be selected and propagated. Much the same result was secured with the semicircular conducting septum of my copending application, but there is the important difference that when an $H_{11}$ wave is applied to a semi-circular septum as a converter the resulting waves are $H_{11}$, $E_{01}$ and $H_{21}$ and if the $E_{01}$ wave is desired, not only the $H_{21}$, but also the $H_{11}$ wave must be suppressed. In the semi-circular series converting element described above, however, the $H_{11}$ wave is completely converted making the separation of the undesired wave a much easier task.

While the devices thus far described are wave type converters in themselves, it is apparent that a large number of converters can be built using the simpler converters in one combination or another. Thus consider the assemblage of Fig. 8 which is a longitudinal section of an $H_{11} \rightleftarrows E_{01}$ converter. The $H_{11}$ wave enters through the cylindrical guide 1 of such diameter, as indicated on the drawings, that it will support only an $H_{11}$ wave. At 2 the diameter is expanded to a value such that an $E_{01}$ wave can be supported but not an $H_{21}$ wave and the longitudinal conducting septum 3 is introduced which divides the guide into two equal sectors. At the section A—A shown in Fig. 8A the radius of the upper sector is decreased by a metallic filler piece 4. This filler extends over a section from A to B, this distance being made such that in this interval there is a 180 degree phase shift between the waves in the upper and lower sectors. Fig. 8C shows how the field distribution at B—B is resolvable into $E_{01}$ and $H_{21}$ distributions all in a manner described more fully in my copending application. Thus it is evident that the cross-section B—B may be considered as a source of each of these waves. Of the two, only the $E_{01}$ wave can be propagated in the particular converter now in mind because of the restriction on the diameter of the guide extending to the right. If the dimensions are perfectly chosen the assemblage of Fig. 8 would constitute a perfect $H_{11} \rightleftarrows E_{01}$ converter. A pure $H_{11}$ wave entering it would emerge as a pure $E_{01}$ wave. In practice it may be advisable to add an $E_{01}$ conformal grating of the type described in my copending application thus suppressing any wave impurities which might arise from imperfections in the apparatus as shown.

There will be in general some reflection at the section A—A of Fig. 8 where the radius of the sector is decreased. This can be minimized by decreasing the radius gradually instead of in an abrupt step and a similar procedure could be followed at the section B—B. It should be noted also that the phase-shift between the waves in the upper and lower sectors is a function of two variables, namely, the difference in radii of the two sectors and their length. Thus the difference in radii may be large and the length correspondingly small, or vice versa. Advantage can be taken of this flexibility in the dimensions by arbitrarily taking the radii and length of the upper and lower sectors so that the upper one is one-quarter wave-length (or any odd number of quarter wave-lengths) long and the lower one three-quarters of a wave-length in length. It is to be pointed out that in a uniform transmission line having no losses a section of line of different characteristic impedance can be inserted without reflection loss if the inserted section has a length equal to an odd number of quarter wave-lengths and this property can be used to advantage in these converters. Thus a special form of Fig. 8 would be as in Fig. 9 where denoting the wave-length in the upper sector by $\lambda_{Ga}$ and the wave-length in the lower section by $\lambda_{Gb}$ the radii of the two sectors are so chosen that the length of the constricted portions are one-quarter $\lambda_{Ga}$ for the upper section and three-quarters $\lambda_{Gb}$ for the lower sector.

It may be pointed out that while the conversions described above have been from an $H_{11}$ wave to an $E_{01}$ wave, the same device can be used to effect an $E_{01}$ to $H_{11}$ conversion. Thus in Fig. 8 if an $E_{01}$ wave is passed into the apparatus at the right-hand end, an $H_{11}$ wave will issue from the left-hand end. The bilateral utility of the converter of Fig. 8 is indicated by the notation $\rightleftarrows$; thus Fig. 8 represents an $H_{11}\rightleftarrows E_{01}$ converter. This bilateral property is characteristic of all the converters described in this specification.

The converting action could also be effected by insertion of a dielectric sheet in one of the sectors as shown in Fig. 10. Here the elements 1, 2, 3 and 5 are the same as in Fig. 8, but there has been introduced a sheet of low-loss dielectric material 4 placed across one of the sectors of thickness such that the phase change produced in a wave traveling through it is approximately 180 degrees greater than the phase change undergone by the wave in traveling through an equal length of guide with air dielectric. This dielectric sheet is shown in Fig. 10A as extending entirely over a cross-section of one sector. Such a converter could be made in very small longitudinal dimensions if a material of high dielectric constant were used. Advantages from the standpoint of impedance matching would accrue, if the thickness of the dielectric were adjusted so that an odd number of quarter wave-lengths is included in the dielectric section as discussed above in connection with phase-shifts introduced by changes in radius of the sectors.

If the $H_{21}$ wave form is the one desired, separation of this wave from the $E_{01}$ component, simultaneously present in converters of the type of Fig. 8, is rendered somewhat difficult for we cannot use the "cut-off" feature, since a guide that would transmit an $H_{21}$ wave would also transmit an $E_{01}$ wave. A simple conformal grating consisting of two diametral planes similar to those of Fig. 5B will not serve the purpose, for although such a grating will pass the $H_{21}$ wave without impediment when properly oriented, it can be shown that the $E_{01}$ wave will also pass through it, being first transformed to four component waves in the grating and then upon emerging from the grating being transformed into a mixture of $E_{01}$ and $H_{41}$ waves. I find that an effective way to accomplish the separation is by use of an assemblage such as that of Fig. 11. This converter starts with an $H_{11}\rightleftarrows E_{01}$ converter as shown in Fig. 8, and following the initial section a sufficient length of guide to insure complete suppression of the $H_{21}$ component is inserted. The guide is then expanded to a diameter which will support an $H_{21}$ wave, but not an $H_{41}$ wave. In the expanded section, there are placed two mutually perpendicular conducting planes 6. The $E_{01}$ wave incident on this is broken down into four independent waves, one in each of the four quadrants. Each of the waves is a sector of an $H_{21}$ wave, but the waves in the upper and lower sectors are displaced in phase 180 degrees from the waves in the side sectors. It is apparent then that one may insert sections of reduced diameter in the upper and lower sectors as shown at 7 in Fig. 11 so to retard the phase of these waves by 180 degrees and make the wave issuing from the assemblage a pure $H_{21}$ wave. The situation at various points along the right-hand half of the converter assemblage is shown by the cross-sectional views of Figs. 11A to 11D.

It must be understood, of course, that the distance from section AA to the equivalent source of the $E_{01}$ wave must be adjustable to secure proper impedance matching. It may be noted also that taken by itself the right-hand half of Fig. 11 is an $E_{01}\rightleftarrows H_{21}$ converter, and may be used for this purpose independently. But the figure illustrates the idea of converting between given wave types in two or more stages, which I find to be a useful method in that with relatively simple converting members a high degree of purity in the resulting wave can be assured.

Expressed more broadly this example illustrates an important feature of my invention which may be stated as consisting of a conversion from an A type wave to a C type of wave through a conversion from the A type to the B type followed by a conversion from the B type to the C type for purpose of obtaining a more satisfactory purification of the C type than might be obtained by a one-stage conversion.

Thus far the embodiments disclosed have made use of guides of circular cross-section with sectorial planes, and we will now turn to converters using square and rectangular cross-sections. Such a one is illustrated in Fig. 12, showing an $H_{11}\rightleftarrows E_{01}$ converter. The entire converter is enclosed within a guide of square cross-section at the left-hand end of which a linearly polarized $H_{11}$ wave is impressed with its electromotive intensity directed across a diagonal of the square as shown in Fig. 12A. The wave progresses along the guide to section BB where the guide is divided into four similar square guides by metallic partitions indicated in Fig. 12B. At this point, the original wave breaks up into four waves, each linearly polarized in the direction of a diagonal of the smaller guides as shown at section BB. The four waves then proceed, each in its own guide to a point where the dimensions of three of the guides are changed. On the upper left, the square cross-section is changed to rectangular, one of the original dimensions remaining unchanged. On the lower right, the square cross-section is changed to rectangular with dimensions the same as on the upper left. On the lower left, the cross-section is still square, but with sides of a length equal to the smaller of the sides of the rectangular sections. Now as the waves progress still further to the right, there ensues a process of phase shifting among the components of the several electromotive intensities, arriving at a condition at CC shown in Fig. 12C, all as explained earlier in the specification. We may take the phase of the wave in the unmodified upper right sector as reference phase. Then in the upper left sector, the vertical component of the wave proceeds in phase with the reference wave. The phase of the horizontal component, however, lags behind the reference phase, and the resultant wave in this sector passes through stages of elliptical polarizations until eventually the horizontal component lags the vertical component by 180 degrees at which place the resultant vector is again linearly polarized but rotated 90 degrees in space from its initial direction. The stages in this process are illustrated by the sectional views of Figs. 12A to 12E. In the same manner the direction of polarization of the resultant wave in the lower right sector is rotated through 90 degrees. In the lower left sector, both horizontal and vertical components of the wave lag the reference phase by 180 degrees so that the resultant at section EE is rotated 180 degrees in space. But now it is readily seen that the distribution of electromotive intensity at section EE is equivalent of an $E_{01}$ and $H_{41}$ field superposed so that if at section EE the converter unit is coupled to a guide suitable for transmitting $E_{01}$ but too small to transmit $H_{41}$, the conversion has been accomplished. Details of the structure between the converter and the $H_{11}$ source to the left and between the converter and the transmission medium on the right have been omitted since they are not essential to the conversion, and may assume any one of a variety of forms such as have already been described. The details of the structure may be varied considerably. For example, the section from 12B to 12C may be quite long or may be shortened, even to the extent of elimination.

Various rearrangements in the converting section of Fig. 12 may be adapted for other forms of conversion. For instance, referring to Fig. 13, there is shown an $H_{11} \rightleftarrows H_{01}$ converter which differs from Fig. 12 only in the locations of the four pieces used to form the rectangular and square sections of reduced dimensions. The explanation is similar to that given in Fig. 12, the incident $H_{11}$ wave being split into four waves each of these waves being divided into two components and the phases of the selected components being retarded in phase by 180 degrees with respect to the remaining components. Consequently, the four resultant waves are rotated progressively as shown in the sections of Figs. 13A to 13E. It is apparent from the electromotive intensities that one derives an $H_{01}$ wave from this assemblage.

The converter of Fig. 13 is also suitable for the conversion $H_{11} \rightleftarrows H_{21}$ merely by rotating the converter through 90 degrees or, what is the same, rotating the plane of polarization of the incident $H_{11}$ wave through 90 degrees as shown in Fig. 14A. The process of conversion can be followed by referring to Figs. 14A to 14E in a manner analogous to that of previous figures.

While the change in velocity of one section of the wave has been described explicity as being obtained by the introduction of metallic inserts to change the cross-section of the component parts of the guide it should be pointed out that the results may be obtained in other ways. Thus, so far as the guide of circular cross-section is concerned, it is possible, as shown in Fig. 15, to use a septum which is displaced from the diametral plane, so dividing the tube into two sections of different cross-sectional area each with a different characteristic velocity for the wave which is being propagated. Also, in regard to the guides of square cross-section, it will be evident that the provision of two square sections and two rectangular sections may be obtained as shown in Fig. 16 by the introduction of two mutually perpendicular metal septa both of which are displaced from the center of the original square wave guide.

Thus far the feature of obtaining phase displacement between the components of the incident wave has been described as being obtained by sending the components through various sections of guide with different characteristic phase velocities. The essential thing so far as this portion of my invention is concerned is that there shall be a difference in time of transit of the components in their respective guide sections and this difference in time of transit may be obtained by other methods than thus far described. In Fig. 17, there is shown a wave guide portion which is the electrical equivalent of the structure of Fig. 8. In this case the incoming wave guide is divided into two branches at 20, which branches then come together at 21. The one branch 22, however, is definitely made longer than the other so that even though the cross-section of the two paths may be the same, having the same characteristic phase velocity of the two components, when they come together at 21, will be displaced in phase one with respect to the other due to the increased time of transit over the longer path. The difference in length between these two paths obviously is designed to be of the amount to give the desired phase-shift.

A modification of the arrangement of Fig. 17 is shown in Fig. 18 in which the length of one of the branches is made adjustable so that the difference in time of transit and therefore the relative phase-shift may be set to any desired value. Adjustability is obtained in this specific embodiment by interposing a U-shaped guide portion 23 in the longer branch, the ends of this portion having a sliding fit with the stub ends 22' of the branch. In both Figs. 17 and 18 it is desirable that the metallic septa extend in both directions from the division point a sufficient length to provide a smooth division of the incident wave into its several parts.

Although the invention has been described largely in terms of converters using circular sectors or of converters using rectangular sectors, it will be clear that these may be used in combinations in a large variety of ways which will now be apparent to any one skilled in the art; and it is to be understood that such combinations are contemplated as coming within the purview of my invention.

What is claimed is:

1. In a system for the transmission of dielectrically guided waves comprising a wave guide and a generator of waves of a definite type connected thereto, the method of converting from the incident type of wave to another which consists in subdividing the wave into a plurality of sections, transmitting these component waves with different velocities until a desired phase displacement between them is obtained and then recombining the components to form a wave of a new type.

2. In a system for the transmission of dielectrically guided waves comprising a wave guide and a generator of waves of a definite type connected thereto, the method of converting from the incident type of wave to another which consists in subdividing the wave longitudinally into a plurality of sections, transmitting these component sections independently with different velocities until a desired phase displacement between them is obtained and then recombining the components to form a wave of a new type.

3. In a system for the transmission of dielectrically guided waves comprising a wave guide and a generator of waves of a definite type connected thereto, the method of converting from the incident type of wave to another which consists in subdividing the wave into two sections, transmitting these component waves with different velocities until a desired phase displacement between them is obtained and then recombining the components to form a wave of a new type.

4. In a system for the transmission of dielectrically guided waves comprising a wave guide and a generator of waves of a definite type connected thereto, the method of converting from the incident type of wave to another which consists in subdividing the wave longitudinally into four sections, transmitting these component waves with different velocities until a desired phase displacement between them is obtained and then recombining the components to form a wave of a new type.

5. In a system for the transmission of dielectrically guided waves comprising a wave guide and a generator of waves of a definite type connected thereto, the method of converting from the incident type of wave to another which consists in dividing the incident wave energy between two paths of different characteristic velocities, propagating the component parts along these paths until a desired phase-shift between them is attained, and recombining the components to yield a wave of a new type.

6. In a system for the transmission of dielectrically guided waves comprising a wave guide and a generator of waves of a definite type connected thereto, the method of converting from the incident type of wave to another which consists in dividing the incident wave energy into a plurality of paths of different characteristic velocities, propagating the component parts along these paths until a desired phase-shift between them is attained and recombining the components to yield a wave of a new type.

7. In a system for the transmission of dielectrically guided waves comprising a wave guide and a generator of waves of a definite type connected thereto, the method of converting from the incident type of wave to another which consists in dividing the incoming wave energy into a plurality of paths, propagating the component parts along these paths and recombining them on emergence, the time of transit of the wave through the paths differing by such amounts that on emergence the component parts differ in phase by a predetermined amount.

8. In a dielectric wave guide system comprising a wave guide and a generator of waves of a definite type connected thereto, means for converting from the incident type of wave to another consisting of a section of wave guide divided longitudinally into a plurality of sections, the sections being of such nature that the time of transit of the wave components through these sectors differs by such an amount that on emergence from the converters the components recombine to yield a wave of a new type.

9. The combination of claim 8 characterized by the fact that the difference in time of transit of the waves over the sectors is introduced by having the paths of different lengths.

10. The combination of claim 8 characterized by the fact that the difference in time of transit of the waves over the different sectors is introduced by modifying the cross-section of some of the sectors.

11. The combination of claim 8, characterized by the fact that the difference in time of transit of the waves over the different sectors is introduced by modifying the dielectric characteristics of one or more of the sectors.

12. In a system for the transmission of dielectrically guided waves comprising a wave guide and a generator of waves of a definite type connected thereto, means for converting from the incident type of wave to another, comprising a section of wave guide subdivided longitudinally over a portion of its length, means for modifying the cross-section of at least one of the subdivisions to allow different velocities for the wave trains in the different subdivisions, the length of the subdivided portion being adjusted to yield a desired phase displacement of the component trains whereby the emergent component waves upon recombining yield new types of waves for transmission.

13. In a system for the transmission of dielectrically guided waves comprising a wave guide and a generator of waves of a definite type connected thereto, means for converting from the incident type of wave to another consisting of a section of wave guide, means for dividing the section longitudinally over a portion of its length into a plurality of sectors and means for modifying the cross-sections of the alternate sectors to allow different velocities for the wave trains in the two groups of sectors.

14. The combination of claim 13 characterized by the fact that the longitudinal length of the sectored portion of the guide is adjusted to yield a desired phase displacement of the component wave trains whereby upon emergence the component trains recombine to yield new types of waves for transmission.

15. In a dielectric guide system, a converter comprising a guide section of circular cross-section, a longitudinally diametral plane therein dividing the guide into two semi-circular sectors, means for changing the phase velocity in one sector as compared to the other two, introducing phase shift between the wave components in the two sectors.

16. In a dielectric guide system, a converter comprising a guide section of circular cross-section, a plurality of longitudinal diametral planes therein dividing the guide into a plurality of sectors, means for changing the phase velocity in the alternate sectors as compared to the velocity in the other sectors in order to introduce a phase-shift between the wave components in the two sets of sectors, and a wave guide associated with the output end of the converter into which the component waves from the sectors may be launched and combined into a resultant wave.

17. The combination of claim 15 characterized by the fact that following the converter there are elements to suppress undesired components of the converter output.

18. In a dielectric guide system, a converter comprising a section of guide of rectangular cross-section, longitudinal conducting planes therein dividing it into a plurality of sectors, and means for changing the dimentions of the sectors to introduce phase displacement between the wave components in the various sectors.

19. A converter of dielectrically guided waves comprising a section of guide of rectangular cross-section with characteristic wave velocity of different values for waves polarized along one side of the rectangle or the other, and means for impressing thereon a wave polarized in a plane not parallel to the sides of the rectangle.

20. In a dielectric guide system, a converter comprising a section of guide of rectangular cross-section, and means for impressing thereon at one end a dielectrically guided wave with its plane of polarization along a diagonal of the rectangle whereby the incident wave changes gradually into an elliptically polarized wave as the wave progresses along the rectangular guide.

21. In a dielectric wave guide system, a section of guide of rectangular cross-section, means for impressing thereon at one end a dielectrically guided wave with its plane of polarization along a diagonal of the rectangle whereby one wave component of the incident wave changes phase with respect to the other, the length of the section being such that the plane of polarization of the incident wave is rotated through 90 degrees.

22. In a dielectric guide system, a converter comprising a section of guide of square cross-section and longitudinal conducting planes therein dividing it into a plurality of sectors.

23. In a dielectric guide system, a converter comprising a section of guide of square cross-section, longitudinal conducting planes therein dividing it into a plurality of sectors, and means for changing the dimensions of the sectors to introduce phase displacement between the wave components in the various sectors.

24. In a dielectric wave guide, a converter comprising a section of guide of square cross-section, two diagonal conducting planes in said section dividing the cross-section into four sectors, means for reducing the cross-section of two alternate sections to modify the phase velocity of the component waves therein whereby upon emergence from the converter the components will be displaced in phase with respect to each other and recombined to yield a wave of a new type.

25. In a dielectric guide system, a converter comprising a section of guide of square cross-section, longitudinal conducting planes therein dividing it into four rectangular sections with a plurality of different cross-sections, and means for impressing thereon an incident wave plane polarized along a diagonal of the square to yield on emergence from the converter a wave of a new type.

26. In a dielectric wave guide system comprising a wave guide and a generator of waves of a given type connected thereto, means for converting from the incident type of wave to a different desired type of great purity, said means consisting of a converter from the given type to an intermediate type followed by a converter from the intermediate type to the desired type.

ARNOLD E. BOWEN.